United States Patent
Horii et al.

(10) Patent No.: US 9,570,950 B2
(45) Date of Patent: Feb. 14, 2017

(54) PERMANENT MAGNET EMBEDDED ROTARY ELECTRIC MACHINE

(71) Applicant: Mitsubishi Electric Corporation, Chiyoda-ku, Tokyo (JP)

(72) Inventors: Masaki Horii, Chiyoda-ku (JP); Masaya Inoue, Chiyoda-ku (JP); Yoshiaki Kitta, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 321 days.

(21) Appl. No.: 14/171,156

(22) Filed: Feb. 3, 2014

(65) Prior Publication Data
US 2015/0115751 A1 Apr. 30, 2015

(30) Foreign Application Priority Data
Oct. 29, 2013 (JP) .................................. 2013-223890

(51) Int. Cl.
*H02K 9/20* (2006.01)
*H02K 1/32* (2006.01)
(Continued)

(52) U.S. Cl.
CPC .............. *H02K 1/32* (2013.01); *H02K 1/2766* (2013.01); *H02K 9/19* (2013.01)

(58) Field of Classification Search
CPC .......... H02K 1/2766; H02K 1/32; H02K 9/19; H02K 9/20
(Continued)

(56) References Cited

U.S. PATENT DOCUMENTS

| 7,705,503 B2 * | 4/2010 | Takahashi | ................ H02K 1/32 |
| | | | 310/156.53 |
| 2006/0186752 A1* | 8/2006 | Matsumoto | ............ H02K 1/276 |
| | | | 310/156.53 |

(Continued)

FOREIGN PATENT DOCUMENTS

| JP | 55-153849 U | 4/1979 |
| JP | 2006188962 A | 7/2006 |

(Continued)

OTHER PUBLICATIONS

Communication dated Oct. 27, 2015, issued by the Japanese Patent Office in counterpart Japanese application No. 2013-223890.

(Continued)

*Primary Examiner* — Alex W Mok
(74) *Attorney, Agent, or Firm* — Sughrue Mion, PLLC; Richard C. Turner

(57) ABSTRACT

A permanent magnet embedded rotary electric machine includes: permanent magnets 23 respectively accommodated in the magnet accommodation holes 25. In the magnet accommodation hole 25, a portion of each permanent magnet 23 corresponding to the radially outer side of the rotor iron core 21 is fixed to the rotor iron core 21, and a refrigerant passage 27 is formed, in a shaft direction of the rotor iron core 21, between the rotor iron core 21 and a portion of the permanent magnet 23 corresponding to the radially inner side of the rotor iron core 21. Protrusions 28 are provided, perpendicularly to a passing direction of a refrigerant, on an exposed portion 21a of the rotor iron core 21 in the refrigerant passage 27.

5 Claims, 7 Drawing Sheets

(51) Int. Cl.
*H02K 1/27* (2006.01)
*H02K 9/19* (2006.01)

(58) Field of Classification Search
USPC .................................. 310/54, 156.53, 61
See application file for complete search history.

(56) References Cited

U.S. PATENT DOCUMENTS

| | | | |
|---|---|---|---|
| 2007/0052313 A1 | 3/2007 | Takahashi et al. | |
| 2009/0174273 A1* | 7/2009 | Watanabe | H02K 15/03 310/156.53 |
| 2009/0195111 A1* | 8/2009 | Sakuma | H02K 1/12 310/216.059 |
| 2010/0026127 A1* | 2/2010 | Mizutani | H02K 1/2766 310/156.53 |
| 2010/0231078 A1* | 9/2010 | Taniguchi | H02K 1/276 310/156.21 |
| 2012/0153765 A1* | 6/2012 | Kogure | H02K 1/2766 310/156.53 |
| 2012/0293033 A1* | 11/2012 | Hisada | H02K 1/276 310/156.43 |
| 2013/0076198 A1* | 3/2013 | Asaga | H02K 1/276 310/216.116 |
| 2013/0113328 A1* | 5/2013 | Kogure | H02K 1/2766 310/156.53 |
| 2013/0334910 A1* | 12/2013 | Takahashi | H02K 9/22 310/52 |

FOREIGN PATENT DOCUMENTS

| | | |
|---|---|---|
| JP | 2007-104888 A | 4/2007 |
| JP | 2008-312292 A | 12/2008 |
| JP | 2009-171785 A | 7/2009 |
| JP | 2011-223717 A | 11/2011 |
| JP | 2013-021811 A | 1/2013 |

OTHER PUBLICATIONS

Communication dated Mar. 3, 2015, issued by the Japanese Patent Office in counterpart Japanese application No. 2013-223890.
Communication dated Sep. 2, 2014, issued by the Japanese Patent Office in counterpart Japanese application No. 2013-223890.
Communication dated Nov. 22, 2016, from the Japanese Patent Office in counterpart Japanese application No. 2016-006766.

* cited by examiner

PERMANENT MAGNET EMBEDDED ROTARY ELECTRIC MACHINE

BACKGROUND OF THE INVENTION

1. Field of the Invention

The present invention relates to a permanent magnet embedded rotary electric machine with a permanent magnet embedded in a rotor.

2. Description of the Background Art

Conventionally, a permanent magnet embedded rotary electric machine is known which has a rotor having a permanent magnet embedded in a rotor iron core composed of stacked electromagnetic steel sheets, and a stator having an armature winding around the rotor.

As a method for cooling a permanent magnet in such a permanent magnet embedded rotary electric machine, besides a method of dissipating heat by applying cooling oil to the surface of a rotor from outside, there is a method of providing a refrigerant flow passage in a rotor iron core composed of stacked magnetic material sheets as shown in Patent Document, Japanese Laid-Open Patent Publication No 2011-223717.

However, in such conventional permanent magnet embedded rotary electric machines, since a refrigerant is not directly applied to a permanent magnet, there is a problem that the cooling effect is low, so that the output of the electric machine used for an electric power steering apparatus or the like is difficult to be increased.

SUMMARY OF THE INVENTION

The present invention is to solve such a problem and has an object to provide a permanent magnet embedded rotary electric machine that allows a permanent magnet to be directly cooled by a refrigerant, thereby enhancing the cooling effect for the permanent magnet.

A permanent magnet electric machine of the present invention includes: a stator having an armature winding; a rotor having a rotor iron core composed of magnetic material sheets stacked into a cylindrical shape, and rotatably provided inside the stator, and a plurality of magnet accommodation holes penetrating in the stacking direction of the magnetic material sheets of the rotor iron core, and provided at predetermined positions along the circumferential direction; and a plurality of permanent magnets respectively accommodated in the plurality of magnet accommodation holes. A portion of each permanent magnet corresponding to a radially outer side of the rotor iron core in the magnet accommodation hole is fixed to the rotor iron core, and each permanent magnet is located such that a refrigerant passage for passing a refrigerant therethrough is formed, in a shaft direction of the rotor iron core, between the rotor iron core and a portion of the permanent magnet corresponding to a radially inner side of the rotor iron core in the magnet accommodation hole. A plurality of protrusions are provided, in a direction perpendicular to a passing direction Of the refrigerant, on an exposed portion of the rotor iron core in the refrigerant passage.

According to the permanent magnet electric machine of the present invention, a refrigerant passage is formed under a permanent magnet and a refrigerant is caused to collide with protrusions in the refrigerant passage, so that flow of the refrigerant shifts from laminar flow to turbulent flow, whereby occurrence of a temperature boundary layer in the vicinity of the permanent magnet can be effectively prevented, thus enhancing the cooling effect for the permanent magnet.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
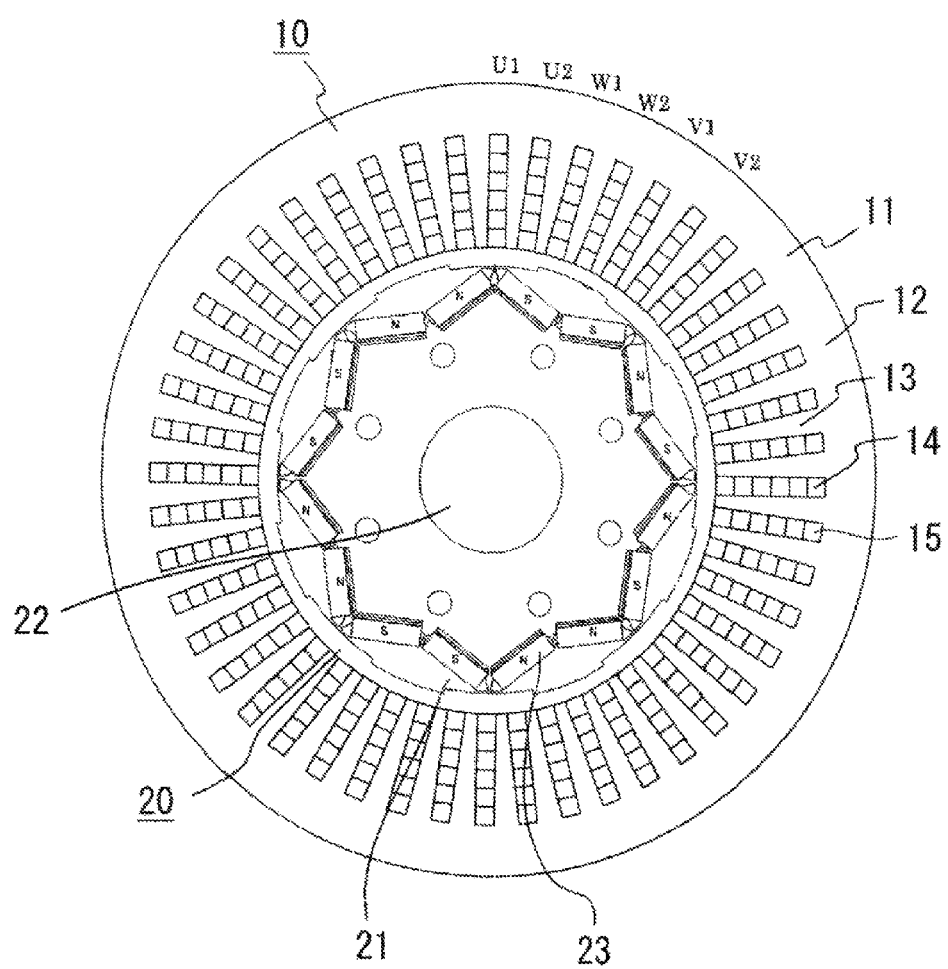
FIG. 1 is a side sectional view showing a permanent magnet embedded rotary electric machine showing the first embodiment of the present invention.

FIG. 1 is a side sectional view showing a permanent magnet embedded electric machine of the first embodiment of the present invention, showing an example in which planar permanent magnets are used and 16 poles and 48 slots are provided.

A stator 10 includes: a stator iron core 11 having a core back 12, teeth 13, and slots 14; and armature windings 15 for U1, U2, W1, W2, V1, and V2 which are wound in a distributed manner and provided in the slots 14.

U1, U2, W1, W2, V1, and V2 denote two pairs of three-phase armature windings 15. Specifically, a first U-phase winding is U1, a second U-phase winding is U2, a first V-phase winding is V1, a second V-phase winding is V2, a first W-phase winding is W1, and a second W-phase winding is W2.

U1, V1, and W1 constitute first armature windings, which are connected to a first inverter, and U2, V2, and W2 constitute second armature windings, which are connected to a second inverter.

On the other hand, a rotor 20 includes: a rotor iron core 21 rotatably provided inside the stator 10; a rotation shaft 22 inserted into a center portion of the rotor iron core 21; and planar permanent magnets 23 embedded in the rotor iron core 21.

Figure 2:
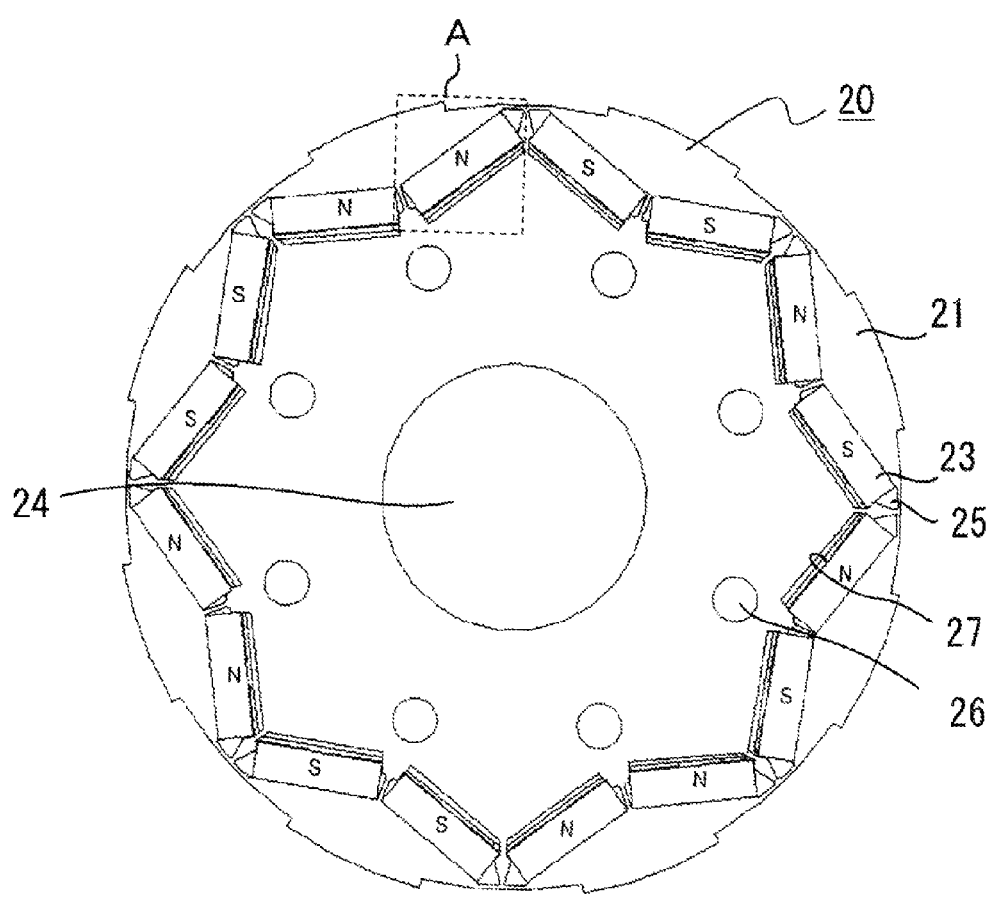
FIG. 2 is a plan view showing a rotor of the first embodiment.

FIG. 2 is a plan view showing the rotor 20 in FIG. 1, in which the rotor 20 has the rotor iron core 21 composed of magnetic material sheets stacked into a cylindrical shape, a shaft insertion hole 24 for inserting the rotation shaft 22 thereto is provided at the center of the rotor iron core 21, sixteen magnet accommodation holes 25 for accommodating the planar permanent magnets 23 therein are provided at regular intervals on the radially peripheral side, and eight through holes 26 which allow cooling oil as a refrigerant to pass therethrough are provided at regular intervals, on the inner circumferential side of the permanent magnets 23, around the shaft insertion hole 24.

It is noted that N and S in FIG. 2 indicate polarities of the permanent magnets 23. That is, in FIG. 1, magnets having different polarities are alternately arranged.

In addition, magnetic material sheets used for the rotor iron core 21 are functional materials obtained by modifying the property (magnetic property) of iron of being attracted to a magnet so that energy exchange between magnetism and electricity can be efficiently performed.

Figure 3:
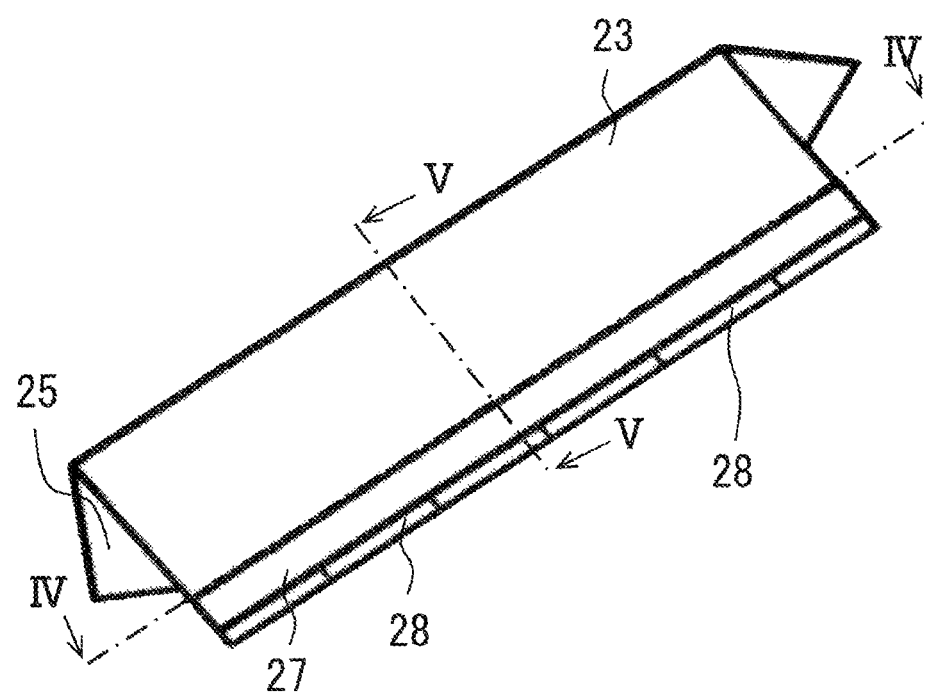
FIG. 3 is a major part enlarged view showing a peripheral area of a permanent magnet in FIG. 2.

FIG. 3 is an enlarged view of portion A in FIG. 2 showing the structure of the peripheral area of the permanent magnet accommodated in the magnet accommodation hole 25, in which a refrigerant passage 27 for passing cooling oil therethrough is formed between the magnet accommodation hole 25 and the permanent magnet 23.

The refrigerant passage 27 is formed so as to function as a gap through which cooling oil is passed in the shaft direction of the rotor iron core 21 around the permanent magnet 23, and is formed in a gap between a portion of the permanent magnet 23 corresponding to the radially inner side of the rotor iron core 21, and the magnet accommodation hole 25 of the rotor iron core 21.

That is, a portion of the permanent magnet 23 corresponding to a long-side portion on the radially outer side of the rotor iron core 21 in the magnet accommodation hole 25 is one-side-fixed to the rotor iron core 21 by a resin layer for fixation, and the permanent magnet 23 is located such that a gap as the refrigerant passage 27 is formed at a portion of the permanent magnet 23 corresponding to a long-side portion on the radially inner side of the rotor iron core 21 in the magnet accommodation hole without providing a resin layer for fixation.

Figure 4:
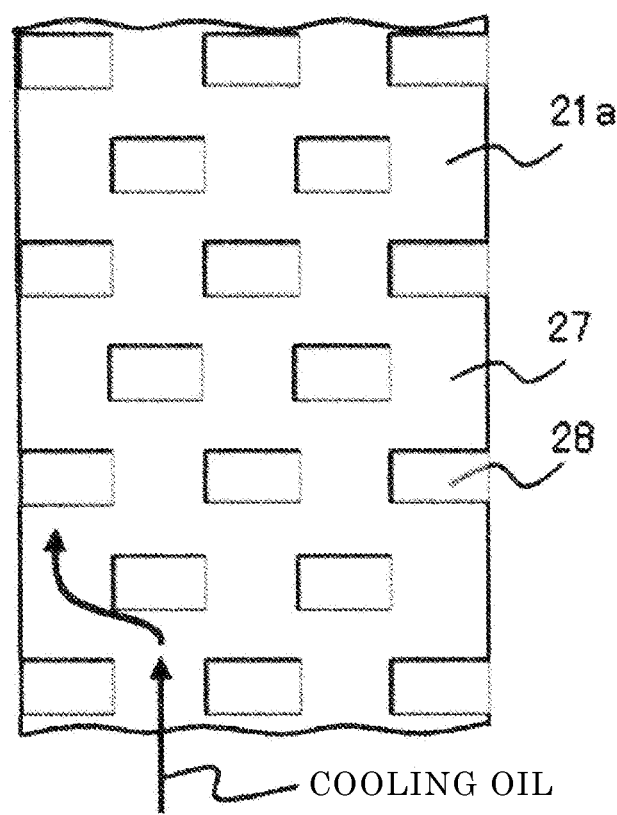
FIG. 4 is a sectional view along IV-IV line in FIG. 3.
Figure 5:
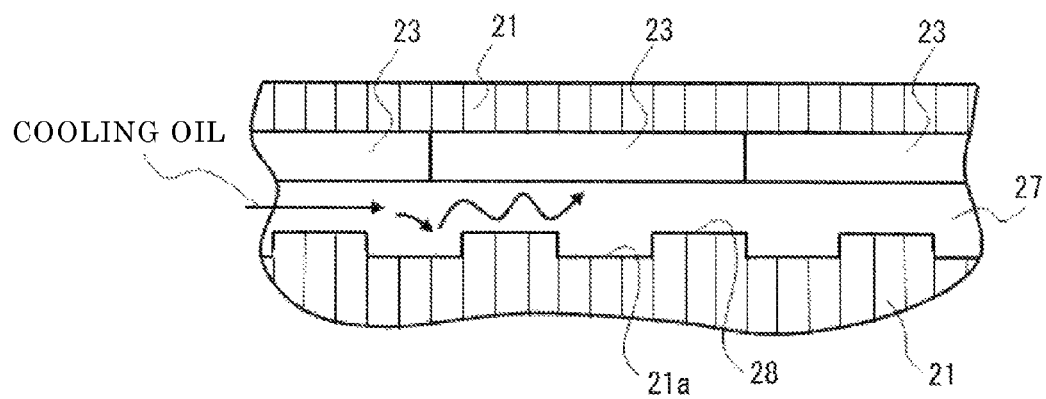
FIG. 5 is a sectional view along V-V line in FIG. 3.

As shown in FIGS. 4 and 5, in the refrigerant passage 27 under the permanent magnet, a plurality of protrusions 28 are alternately arranged on an exposed portion 21a of the rotor iron core 21 in a direction perpendicular to a flowing direction of cooling oil such that the protrusions 28 do not overlap with the adjacent protrusions.

By thus providing the plurality of protrusions 28 in the refrigerant passage 27 under the permanent magnet, cooling oil shifts from laminar flow to turbulent flow when cooling oil collides with the protrusions 28, whereby occurrence of a temperature boundary layer in the vicinity of the permanent magnet can be effectively prevented.

In FIG. 4, the plurality of protrusions 28 are provided, at regular intervals along the shaft direction, on the exposed portion 21a of the rotor iron core 21 on which refrigerant passage 27 under the permanent magnet is formed, and in addition, the adjacent protrusions are arranged so as not to overlap with each other. Therefore, cooling oil becomes more likely to collide with the protrusions 28, and shifts from laminar flow to turbulent flow when cooling oil collides with the protrusions 28, whereby occurrence of a temperature boundary layer in the vicinity of the permanent magnet can be effectively prevented, thus enhancing the cooling effect for the permanent magnet.

It is noted that although not shown, cooling oil is supplied to the refrigerant passage 27 from a hollow hole provided at the center of the rotation shaft 22 through a refrigerant passage formed by a scattering preventing plate provided at one end of the rotor 20.

As described above, the permanent magnet embedded rotary electric machine of the present invention includes: the stator 10 having the armature windings 15; the rotor 20 having the rotor iron core 21 which is composed of magnetic material sheets stacked into a cylindrical shape and is rotatably vided inside the stator 10, and having the plurality of magnet accommodation holes 25 which penetrate in the stacking direction of the magnetic material sheets of the rotor iron core 21 and are provided at predetermined positions along the circumferential direction; and the plurality of permanent magnets 23 respectively accommodated in the plurality of magnet accommodation holes 25, wherein a portion of each permanent magnet 23 corresponding to the radially outer side of the rotor iron core 21 in the magnet accommodation hole 25 is fixed to the rotor iron core 21, and each permanent magnet 23 is located such that the refrigerant passage 27 for passing cooling oil therethrough is formed, in the shaft direction of the rotor iron core 21, between the rotor iron core 21 and a portion of the permanent magnet 23 corresponding to the radially inner side of the rotor iron core 21 in the magnet accommodation hole 25, and wherein the plurality of protrusions 28 are provided, in a direction perpendicular to a passing direction of the cooling oil, on the exposed portion 21a of the rotor iron core 21 in the refrigerant passage 27. Therefore, the permanent magnets 23 can be directly cooled by the cooling oil, and in addition, since the plurality of protrusions 28 are provided in a direction perpendicular to a flowing direction of the cooling oil on the exposed portion 21a of the rotor iron core 21 in the refrigerant passage 27 under the permanent magnet, flow of the cooling oil passing through the refrigerant passage 27 shifts from laminar flow to turbulent flow when the cooling oil collides with the protrusions 28, whereby occurrence of a temperature boundary layer in the vicinity of the permanent magnet can be effectively prevented, thus further enhancing the cooling effect for the permanent magnet 23.

Second Embodiment

Figure 6:
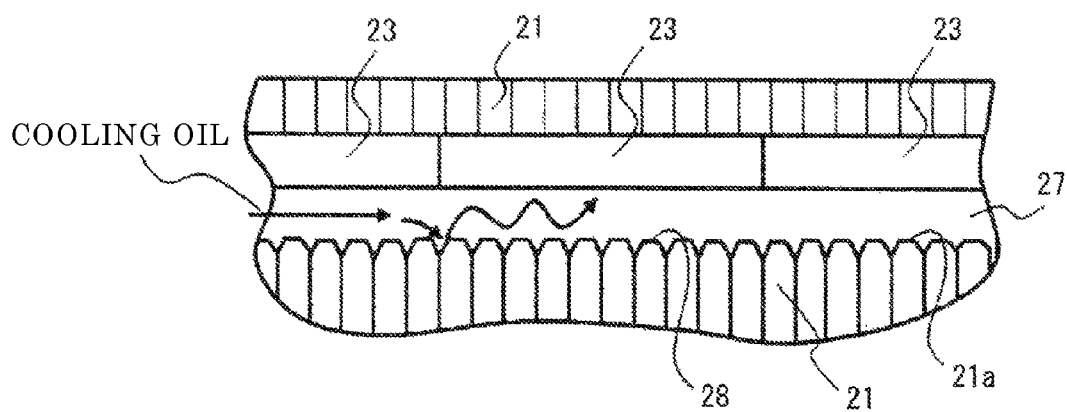
FIG. 6 is a major part sectional view showing the second embodiment of the present invention.

The above first embodiment shows the case where the plurality of protrusions 28 are provided in a direction perpendicular to a flowing direction of the cooling oil on the exposed portion 21a of the rotor iron core 21 in the refrigerant passage 27 under the permanent magnet. In the second embodiment, as shown in FIG. 6, on the exposed portion 21a of the rotor iron core 21 on which the refrigerant passage 27 is formed, the rotor iron core 21 itself forms the protrusions 28 by shaping the ends of the magnetic material sheets composing the rotor iron core 21 into a mountain-like shape.

Thus, in the refrigerant passage 27, the protrusions 28 can be formed by the rotor iron core itself. Therefore, as in the first embodiment, flow of the cooling oil passing through the refrigerant passage 27 shifts from laminar flow to turbulent flow when the cooling oil collides with the protrusions 28, whereby occurrence of a temperature boundary layer in the vicinity of the permanent magnet can be prevented, thus further enhancing the cooling effect for the permanent magnet 23.

Third Embodiment

Figure 7:
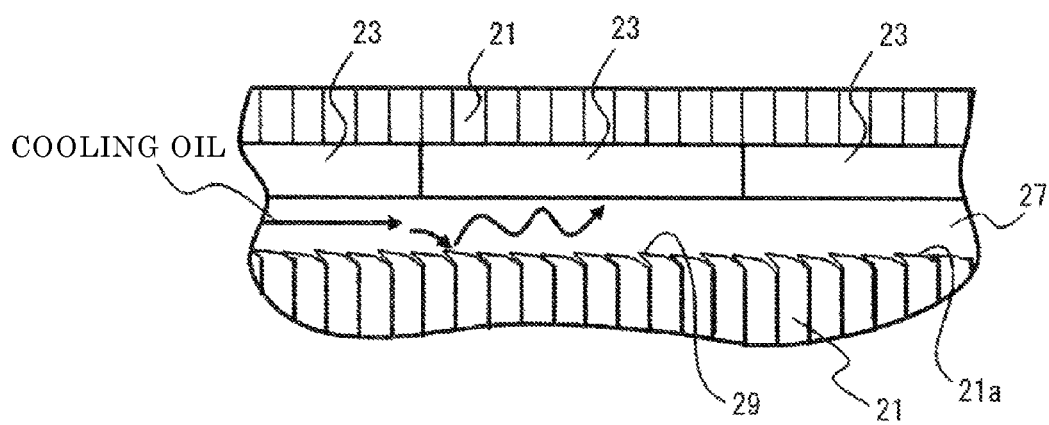
FIG. 7 is a major part sectional view showing the third embodiment of the present invention.

In the above second embodiment, the protrusions 28 are formed by shaping the ends of the magnetic material sheets composing the rotor iron core 21. In the third embodiment, as shown in FIG. 7, shear droops 29 of the ends of the magnetic material sheets formed upon press working are located on the exposed portion 21a of the rotor iron core 21 on which the refrigerant passage 27 is formed, so that the shear droops 29 are utilized as the protrusions.

Thus, the magnetic material sheets obtained by press working can be directly used to form the protrusions 28 in the refrigerant passage 27. Therefore, as in the first and second embodiments, flow of the cooling oil passing through the refrigerant passage 27 shifts from laminar flow to turbulent flow when the cooling oil collides with the shear droops 29, whereby occurrence of a temperature boundary layer in the vicinity of the permanent magnet can be prevented, thus further enhancing the cooling effect for the permanent magnet 23.

It is noted that, within the scope of the present invention, the above embodiments may be freely combined with each other, or each of the above embodiments may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. A permanent magnet embedded rotary electric machine comprising:
   a stator having an armature winding;
   a rotor having:
   a rotor iron core composed of magnetic material sheets stacked into a cylindrical shape, and rotatably provided inside the stator; and
   a plurality of magnet accommodation holes penetrating in the stacking direction of the magnetic material sheets of the rotor iron core, and provided at predetermined positions along the circumferential direction; and
   a plurality of permanent magnets respectively accommodated in the plurality of magnet accommodation holes, wherein
   a portion of each permanent magnet corresponding to a radially outer side of the rotor iron core in the magnet accommodation hole is fixed to the rotor iron core, and each permanent magnet is located such that a refrigerant passage for passing a refrigerant therethrough is formed, in a shaft direction of the rotor iron core, between the rotor iron core and a portion of the permanent magnet corresponding to a radially inner side of the rotor iron core in the magnet accommodation hole, and
   a plurality of protrusions are provided, in a direction perpendicular to a passing direction of the refrigerant, on an exposed portion of the rotor iron core in the refrigerant passage and extend therefrom toward a respective permanent magnet, the protrusions extending only partway between the exposed portion of the rotor iron core and the respective permanent magnet.

2. The permanent magnet embedded rotary electric machine according to claim 1, wherein the protrusions are arranged at regular intervals along a shaft direction of the rotor iron core so as not to overlap with the adjacent protrusions.

3. The permanent magnet embedded rotary electric machine according to claim 1, wherein the protrusions are formed by shaping ends of the magnetic material sheets that oppose the permanent magnets.

4. The permanent magnet embedded rotary electric machine according to claim 1, wherein the protrusions are formed by shear droops of ends of the magnetic material sheets that occur upon press working.

5. The permanent magnet embedded rotary electric machine according to claim 1, wherein
   each permanent magnet has a planar shape, and
   a portion of each permanent magnet corresponding to a long-side portion on the radially outer side of the rotor iron core in the magnet accommodation hole is fixed to the rotor iron core by a resin layer for fixation, and each permanent magnet is located such that a gap as the refrigerant passage is formed at a portion of the permanent magnet corresponding to a long-side portion on the radially inner side of the rotor iron core in the magnet accommodation hole.

* * * * *